(12) United States Patent
Ota et al.

(10) Patent No.: US 9,707,628 B2
(45) Date of Patent: Jul. 18, 2017

(54) ROUGHING END MILL

(71) Applicant: MITSUBISHI MATERIALS CORPORATION, Tokyo (JP)

(72) Inventors: Yasushi Ota, Akashi (JP); Genki Matsumoto, Akashi (JP); Koji Fukata, Akashi (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 61 days.

(21) Appl. No.: 14/780,733

(22) PCT Filed: Mar. 3, 2014

(86) PCT No.: PCT/JP2014/055293
§ 371 (c)(1),
(2) Date: Sep. 28, 2015

(87) PCT Pub. No.: WO2014/156490
PCT Pub. Date: Oct. 2, 2014

(65) Prior Publication Data
US 2016/0059325 A1 Mar. 3, 2016

(30) Foreign Application Priority Data
Mar. 29, 2013 (JP) ................. 2013-070821

(51) Int. Cl.
*B23C 5/16* (2006.01)
*B23C 5/10* (2006.01)

(52) U.S. Cl.
CPC ................. *B23C 5/10* (2013.01); *B23C 5/16* (2013.01); *B23C 2210/0457* (2013.01);
(Continued)

(58) Field of Classification Search
CPC ........ B23C 2210/0457; B23C 2224/32; B23C 2224/36; B23C 5/16; B23C 2228/08;
(Continued)

(56) References Cited

U.S. PATENT DOCUMENTS 4,770,567 A * 9/1988 Moriarty .................. B23C 3/36
407/59
2002/0071949 A1 6/2002 Liu et al.
(Continued)

FOREIGN PATENT DOCUMENTS

JP 4-128115 U 11/1992
JP 09-029530 A 2/1997
(Continued)

OTHER PUBLICATIONS

International Search Report mailed May 20, 2014, issued for PCT/JP2014/055293.
(Continued)

*Primary Examiner* — Sara Addisu
(74) *Attorney, Agent, or Firm* — Locke Lord LLP

(57) ABSTRACT

Even if chips enter a gap between a flank face and a surface to be worked, the defect of the flank face or a cutting edge is suppressed by the control of the flow of the chips. A plurality of cutting edges, which are undulated in wave forms in a direction of an axis, are formed on an outer periphery of a front end portion of an end mill body rotating about the axis so that phases of the wave forms are displaced from each other in a path of rotation about the axis; flank faces of the cutting edges are covered with a coating film; and rough surface regions and smooth surface regions are alternately formed on the surface of at least portions of the coating film, which are close to the cutting edges, in the direction of the axis.

1 Claim, 3 Drawing Sheets

(52) U.S. Cl.
CPC .... *B23C 2210/088* (2013.01); *B23C 2220/60* (2013.01); *B23C 2224/32* (2013.01); *B23C 2224/36* (2013.01); *B23C 2228/08* (2013.01); *B23C 2228/10* (2013.01)

(58) Field of Classification Search
CPC . B23C 2228/10; B23C 5/10; B23C 2210/088; B23C 2220/60
See application file for complete search history.

(56) References Cited

U.S. PATENT DOCUMENTS

| | | | |
|---|---|---|---|
| 2004/0253379 A1 | 12/2004 | Sugita et al. | |
| 2012/0020749 A1 | 1/2012 | Maeda et al. | |
| 2016/0059325 A1* | 3/2016 | Ota | B23C 5/16 407/54 |

FOREIGN PATENT DOCUMENTS

| | | |
|---|---|---|
| JP | 2004-009269 A | 1/2004 |
| JP | 2005-230976 A | 9/2005 |

OTHER PUBLICATIONS

Supplementary European Search Report dated Mar. 13, 2017, issued for the European patent application No. 14773228.3.

\* cited by examiner

ROUGHING END MILL

TECHNICAL FIELD

The present invention relates to a roughing end mill that is used for the roughing or semi-finishing of a workpiece.

BACKGROUND ART

For example, PTL 1 discloses a roughing end mill that includes undulated cutting edges, that is, nicked cutting edges on the outer periphery of a front end portion of an end mill body and reduces cutting resistance by dividing chips, as this type of roughing end mill. Further, PTL 1 discloses a roughing end mill in which a cutting edge portion is covered with one or two or more coating films made of carbide, nitride, oxide, or boride of a group 4a transition element, a group 5a transition element, a group 6a transition element, a group 3b element, and a group 4b element in the periodic table, such as titanium nitride aluminum, for the improvement of wear resistance.

CITATION LIST

Patent Literature

[PTL 1] Japanese Unexamined Patent Application Publication No. 2005-230976

SUMMARY OF INVENTION

Technical Problem

Incidentally, in the roughing end mill, cutting is performed with a feed per one edge, which is smaller than the amplitude of the wave form formed by the cutting edge, so that chips are divided. Accordingly, a gap is formed between a valley portion of the wave form and a surface to be worked of a workpiece. However, if chips are present on the surface to be worked when the surface to be worked is cut by the cutting edge in the end mill-rotation direction, the chips enter a gap, which is formed between a flank face and the surface to be worked, from the gap and are jammed by chaotically flowing out along the flank face when a subsequent cutting edge cuts the surface to be worked. For this reason, there is a concern that a defect may occur on the flank face or the cutting edge.

The invention has been made in consideration of the background, and an object of the invention is to provide a roughing end mill that can suppress the defect of a flank face or a cutting edge by controlling the flow of chips even if chips enter a gap between the flank face and a surface to be worked.

Solution to Problem

In order to solve the above problem and achieve the object, according to the present invention, there is provided a roughing end mill including a plurality of cutting edges that are undulated in wave forms in a direction of an axis and are formed on an outer periphery of a front end portion of an end mill body rotating about the axis so that phases of the wave forms are displaced from each other in a path of rotation about the axis, in which flank faces of the cutting edges are covered with a coating film, rough surface regions and smooth surface regions are alternately formed on the surface of at least portions of the coating film, which are close to the cutting edges, in the direction of the axis, and the number of fine particles or fine protrusions, which have a size in the range of 0.3 μm to 5.0 μm and protrude from the rough surface region, is larger than the number of fine particles or fine protrusions, which have a size in the range of 0.3 μm to 5.0 μm and protrude from the smooth surface region.

In the roughing end mill having the above-mentioned structure, flank faces of the cutting edges are covered with a coating film; rough surface regions from which many fine particles or fine protrusions having a size in the range of 0.3 μm to 5.0 μm protrude and smooth surface regions from which few fine particles or fine protrusions protrude are alternately formed on the surface of at least portions, which are close to the cutting edges, of the coating film covering the flank faces in the direction of the axis; and the smooth surface region is smoother than the rough surface region. Accordingly, even if chips are present on the surface to be worked and enter from a gap between a valley portion of the wave form formed by the cutting edge and the surface to be worked, the flow of the chips is controlled so that the chips flow out to the smooth surface regions having low resistance along the flank faces.

Further, the chips flowing out to the smooth surface regions slide on the smooth surface regions and are quickly discharged with the rotation of the end mill body. Accordingly, it is possible to avoid the occurrence of the jam of the chips that is caused between the flank face and the surface to be worked when chips chaotically flow out and remain on the flank face. Therefore, it is possible to suppress the occurrence of a defect on the flank face or the cutting edge that is caused by the chips that are jammed in this way. Furthermore, since the smooth surface regions are locally formed on the coating film of the flank face, cutting resistance can be reduced.

Advantageous Effects of Invention

As described above, according to the invention, even if chips enter from a gap between a valley portion of the wave form formed by the cutting edge and the surface to be worked, it is possible to quickly discharge the chips by controlling the flow of the chips. Accordingly, it is possible to suppress the occurrence of a defect of the flank face or the cutting edge that is caused when the chips chaotically flow out and are jammed between the flank face and the surface to be worked.

DESCRIPTION OF EMBODIMENTS

Figure 1:
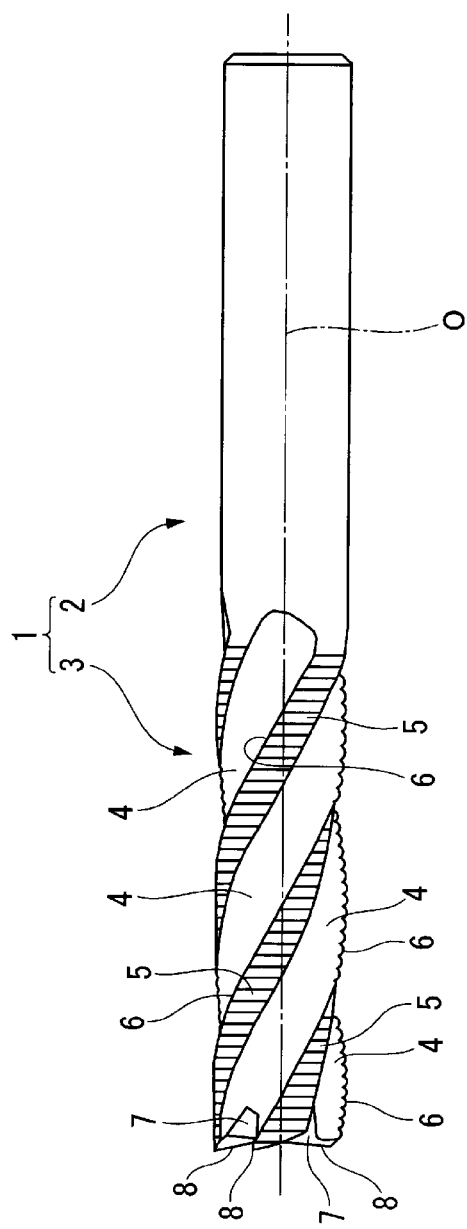
FIG. 1 is a side view showing an embodiment of the invention.
Figure 2:
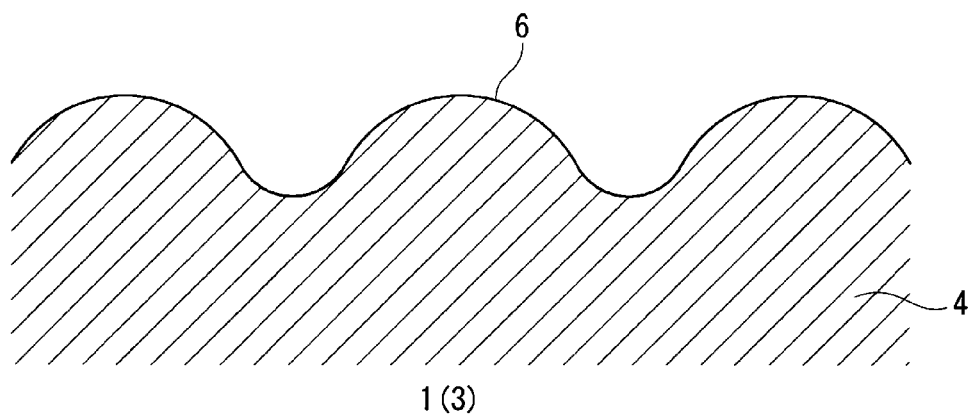
FIG. 2 is an enlarged view of a rake face of the embodiment shown in FIG. 1.
Figure 3:
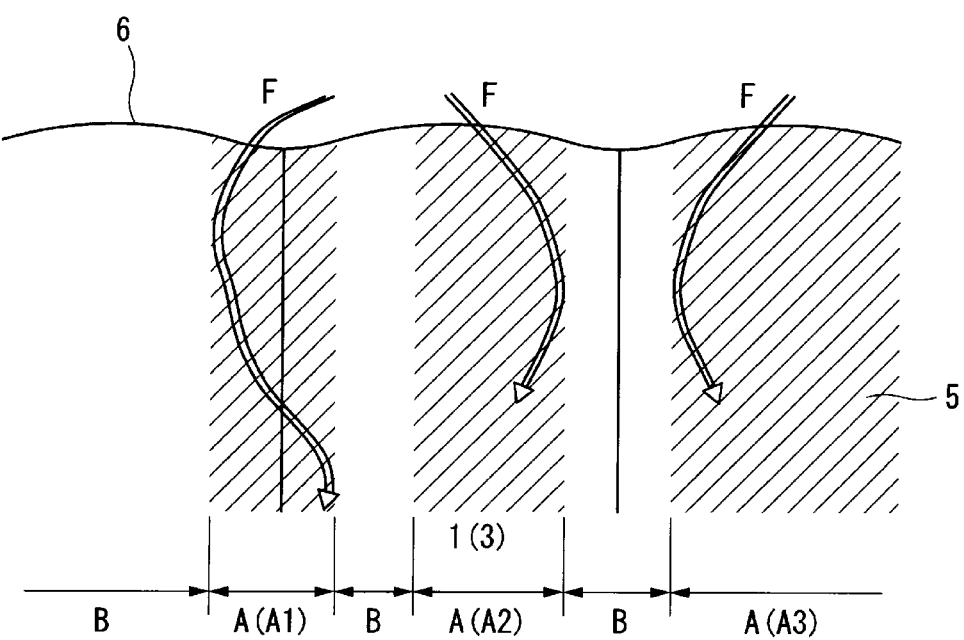
FIG. 3 is an enlarged view of a flank face of the embodiment shown in FIG. 1.

FIGS. 1 to 3 show an embodiment of the invention. In this embodiment, an end mill body 1 is made of a hard material, such as cemented carbide or high-speed tool steel, and is integrally formed in a substantially columnar shape having an axis O as a center. A rear end portion (a right portion in FIG. 1) of the end mill body 1 has a columnar shape and forms a shank portion 2, and a front end portion (a left portion in FIG. 1) forms a cutting edge portion 3. The shank portion 2 of the roughing end mill is held by the spindle of a machine tool and is rotated about the axis O in an end mill-rotation direction T, so that roughing or semi-finishing is performed on a workpiece by the cutting edge portion 3.

A plurality of chip discharge grooves 4, which are twisted toward the rear side in the end mill-rotation direction T, are formed on the outer periphery of the cutting edge portion 3 from the front end of the end mill body 1 toward the rear end thereof in the direction of the axis O. Cutting edges (outer peripheral cutting edges) 6, which include wall surfaces as rake faces, are formed at crossing ridge line portions between wall surfaces of the chip discharge grooves 4, which face the end mill-rotation direction T, and flank faces (outer peripheral flank faces) 5 that are formed on the outer periphery of the cutting edge portion 3. Further, a gash 7 is formed at the front end portion of each of the chip discharge grooves 4, and an end cutting edge 8 is formed at a crossing ridge line portion between a wall surface of the gash 7, which faces the end mill-rotation direction T, and a front end flank face that is formed at the front end of the cutting edge portion 3. Meanwhile, the roughing end mill of this embodiment is formed of a square end mill of which an end cutting edge 8 extends substantially along a horizontal plane perpendicular to the axis O.

The flank face (outer peripheral flank face) 5 is formed in a shape, which is undulated in a radial direction with respect to the axis O, in a wave form in the direction of the axis O. Accordingly, the cutting edge 6 is also formed in an undulated shape in a wave form in the direction of the axis O (a horizontal direction in FIG. 2) as shown in FIG. 2 when viewed in a direction facing the rake face. In this embodiment, the wave form, which is formed by the cutting edge 6 when viewed in a direction facing the rake face, is a shape in which, for example, convex arcs having the same radius and the same central angle and concave arcs having the same radius smaller than the radius of the convex arc and the same central angle are alternately continued so as to be adjacent to each other.

Further, the plurality of cutting edges 6, which are formed at the plurality of chip discharge grooves 4, are formed so that the radii of the concave and convex arcs are equal to each other and the wavelengths and amplitudes of the wave forms formed by the cutting edges 6 are equal to each other. However, the phases of the wave forms formed by the cutting edges 6 are displaced from each other in the path of rotation about the axis O. For example, the phases of the wave forms formed by the cutting edges 6 are sequentially displaced from each other in the direction of the axis O toward the end mill-rotation direction T side by a length that is obtained by dividing the wavelength of the wave form of the cutting edge 6 by the number of the cutting edges 6.

Meanwhile, a positive rake angle in the radial direction is given to the rake face of the cutting edge 6. Accordingly, even when viewed in a direction facing the flank face 5, the cutting edge 6 forms an undulated wave form in the circumferential direction of the end mill body (in a vertical direction in FIG. 3) along the direction of the axis O (a horizontal direction in FIG. 3) as shown in FIG. 3 according to the pitch of undulations that is obtained when viewed in the direction facing the rake face. However, the amplitude of the undulation, which is obtained when viewed in the direction facing the flank face 5, is smaller than that which is obtained when viewed in the direction facing the rake face.

In addition, the surface of at least the cutting edge portion 3 of the end mill body 1 is covered with a coating film. The coating film is made of carbide, nitride, oxide, carbonitride, or boride of metal containing one or two or more kinds of elements among a group 4a transition element, a group 5a transition element, a group 6a transition element, a group 3b element, and a group 4b element in the periodic table, such as Ti, Al, V, Cr, Zr, and Hf. The coating film is a film made of a high-melting-point hard material, typically, TiN, TiCN, AlTiN, AlCrN, AlTiSiN, or AlCrSiN; and is formed so as to have a predetermined thickness by a physical vapor deposition (PVD) method, such as an ion plating method or a sputtering method. Particularly, it is preferable that the coating film is formed by an arc ion plating method.

Fine particles or fine protrusions made of the high-melting-point hard material sporadically protrude from the surface of the coating film, which is formed in this way, so as to have a size in the range of about 0.3 µm to 5.0 µm. Accordingly, the surface of the coating film is formed of a rough surface. In this embodiment, the fine particles or the fine protrusions, which protrude as described above, are partially removed and reduced from the coating film of portions of at least the flank faces 5, which are close to the cutting edges 6, to form smooth surface regions A where the number of the protruding fine particles or the protruding fine protrusions is small.

Further, since fine particles or fine protrusions having a size in the range of 0.3 µm to 5.0 µm remain on portions from which the fine particles or the fine protrusions are not removed, the portions from which the fine particles or the fine protrusions are not removed form rough surface regions B of which the number of protruding fine particle or protruding fine protrusions is larger than that of the smooth surface regions A. It is preferable that the number of the fine particles or the fine protrusions, which protrude from the smooth surface regions A and have a size in the range of 0.3 µm to 5.0 µm, is 40% or less of the number of the fine particles or the fine protrusions, which protrude from the rough surface region B and have a size in the range of 0.3 µm to 5.0 µm, per unit area (for example, 0.01 mm$^2$). In some cases, the fine particles or the fine protrusions, which protrude so as to have a size of 0.3 µm or more, may not be formed on the smooth surface regions A.

For example, grinding that uses brushes containing abrasive grains, abrasive cloth, or buff; polishing or lapping; shot blasting that blasts small diamond abrasive grain or the like as shot grains by a pressurized fluid, or the like is used to form the smooth surface regions A. For example, when the smooth surface regions A are formed by using shot blasting, shot grains may be blown after masking is performed on the rough surface regions B that are to remain as rough surfaces. However, the flank faces 5 of the roughing end mill are undulated so as to have wave forms in the direction of the axis O as described above. Accordingly, in order to allow the rough surface region B to remain on a valley portion that is a concave portion of the wave form, shot grains may be blown from the outer peripheral side inclined with respect to the axis O so as to be blocked at an apex that is a convex portion of the wave form so that the rough surface region B remains on the valley portion.

In FIG. 3, the smooth surface regions A and the rough surface regions B are alternately formed in the direction of the axis O. Among them, the smooth surface region A1 disposed on the left side in FIG. 3 extends from the valley portion that is the concave portion of the undulation of the wave form formed by the cutting edge 6 and the smooth surface region A2 disposed in the middle in FIG. 3 extends to one side in the direction of the axis O from the apex that is the convex portion of the wave form. In addition, the smooth surface region A3 disposed on the right side in FIG. 3 extends from the apex to both sides in the direction of the axis O.

Meanwhile, each of the smooth surface regions A and the rough surface regions B extends in the circumferential direction so as to have a constant width in the direction of the axis O in FIG. 3. However, the width of each of the smooth surface regions A and the rough surface regions B may be changed in the circumferential direction, and an intermediate region of which the number of fine particles or fine protrusions having a size in the range of 0.3 µm to 5.0 µm increases or decreases may be interposed between the smooth surface region A and the rough surface region B that are adjacent to each other. Moreover, in this embodiment, the entire surface of the cutting edge portion is covered with the above-mentioned coating film, and the chip discharge groove 4, which is formed by the rake faces of the cutting edge 6 and the end cutting edge 8, and the wall surface of the gash 7 facing the end mill-rotation direction T are formed of a smooth surface region of which fine particles or fine protrusions having a size in the range of 0.3 µm to 5.0 µm are removed and reduced.

In the roughing end mill, the end mill body 1 is fed in a direction perpendicular to the axis O so that a feed per one edge is smaller than the amplitude of the wave form formed by the cutting edge 6 when viewed in the direction facing the rake face. Accordingly, a gap is formed between the surface to be worked of a workpiece and the end mill body at the valley portion of the wave form, so that chips are generated so as to be divided. For this reason, cutting resistance can be reduced in the roughing or semi-finishing.

However, since the gap is generated as described above, when chips are present on the surface to be worked in the cutting performed by the cutting edge 6 in the end mill-rotation direction T, the chips enter a gap, which is formed between the flank face 5 of the cutting edge 6 and the surface to be worked, from a gap between the cutting edge 6, which subsequently performs cutting on the end mill-rotation direction T side, and the surface to be worked. Then, the chips are jammed in the gap. Accordingly, the flank face 5 or the cutting edge 6 is crushed by the jammed chips. For this reason, there is a concern that a defect may occur as described above.

In contrast, in the roughing end mill having the above-mentioned structure, the smooth surface regions A and the rough surface regions B are alternately formed on the flank face 5 in the direction of the axis O and the number of fine particles or fine protrusions, which have a size in the range of 0.3 µm to 5.0 µm and protrude from the rough surface region B, is larger than that of the smooth surface region A. Accordingly, for example, as denoted on the left side in FIG. 3 by reference character F, the flow of the chips, which enter from the gap, on the flank face 5 becomes a flow along the smooth surface region A1 that is smooth and has low resistance. That is, even though the chips are to flow to the adjacent rough surface region B from the smooth surface region A1, the chips return to the smooth surface region A1 since many fine particles or fine protrusions protrude from the rough surface region B and the resistance of the rough surface region B is high.

Further, since the smooth surface region A1 is smooth, the chips, which flow on the smooth surface region A1 as described above, are quickly discharged with the rotation of the end mill body 1 so as to slide on the smooth surface region A1 without remaining. Accordingly, according to the roughing end mill having the above-mentioned structure, it is possible to prevent the chips, which enter the gap between the flank face 5 and the surface to be worked as described above, from being jammed. Therefore, it is possible to lengthen the life of the end mill by suppressing the occurrence of a defect on the flank face 5 or the cutting edge 6 that is caused by the jammed chips.

For example, as shown in the middle or the right side in FIG. 3, the same is applied to the flow F of chips that enter the smooth surface regions A2 and A3 connected to the apex that is the convex portion of the wave form of the cutting edge 6. Accordingly, even though the chips are to flow to the rough surface region B from the smooth surface regions A2 and A3, the chips return to the smooth surface regions A2 and A3 and are quickly discharged. Therefore, it is possible to avoid the occurrence of a jam that is caused when chips chaotically flow out and remain on the flank face 5.

Further, the above-mentioned coating film forms a rough surface that includes the fine particles or fine protrusions having a size in the range of 0.3 µm to 5.0 µm and protruding from the entire surface thereof while covering the end mill body. However, since the smooth surface regions A of which the number of protruding fine particles or protruding fine protrusions is small are locally formed on the surface of the coating film of the flank face 5 as in this embodiment, cutting resistance can be reduced. Moreover, since the coating film remains even on the smooth surface regions A and the fine particles or the fine protrusions of the surface are merely removed and reduced, wear resistance is not impaired.

In addition, since the rough surface region B partially remains on the flank face 5, there is no concern of the occurrence of a jam that is caused when chips entering a gap between the flank face 5 and the surface to be worked chaotically flow out unlike in a case in which the entire flank face 5 is formed of the smooth surface region A.

Meanwhile, in this embodiment, the smooth surface regions A (A1 to A3) and the rough surface regions B are formed regardless of the pitch of the undulations formed by the cutting edge 6 as shown in FIG. 3. However, the smooth surface regions A and the rough surface regions B may be periodically and alternately formed in the direction of the axis O according to the pitch of the wave form formed by the cutting edge 6. Accordingly, the flow F of chips along the flank face 5 can be allowed to be the same for each wave of the cutting edge 6, so that the more stable flow F of chips can be controlled.

Further, in FIG. 3, the smooth surface regions A and the rough surface regions B extend from the cutting edge 6 in the shape of stripes. However, when the smooth surface regions A and the rough surface regions B are alternately formed on the cutting edge 6 side in the direction of the axis O, one of the smooth surface regions A and the rough surface regions B are scattered on the other thereof in a spot shape on the rear side of the flank face 5, which is separated from the cutting edge 6, in the end mill-rotation direction T or the surface of the coating film may be formed of only one of the smooth surface region A and the rough surface region B.

REFERENCE SIGNS LIST

1: END MILL BODY
2: SHANK PORTION
3: CUTTING EDGE PORTION
4: CHIP DISCHARGE GROOVE
5: FLANK FACE (OUTER PERIPHERAL FLANK FACE)
6: CUTTING EDGE (OUTER PERIPHERAL CUTTING EDGE)

O: AXIS OF END MILL BODY 1
T: END MILL-ROTATION DIRECTION
A (A1 to A3): SMOOTH SURFACE REGION
B: ROUGH SURFACE REGION
F: FLOW OF CHIPS

The invention claimed is:

1. A roughing end mill comprising:
a plurality of cutting edges that are undulated in wave forms in a direction of an axis and are formed on an outer periphery of a front end portion of an end mill body rotating about the axis so that phases of the wave forms are displaced from each other in a path of rotation about the axis,
wherein flank faces of the cutting edges are covered with a coating film,
rough surface regions and smooth surface regions are alternately formed on the surface of at least portions of the coating film, which are close to the cutting edges, in the direction of the axis, and
the number of fine particles or fine protrusions, which have a size in the range of 0.3 μm to 5.0 μm and protrude from the rough surface region, is larger than the number of fine particles or fine protrusions, which have a size in the range of 0.3 μm to 5.0 μm and protrude from the smooth surface region.

* * * * *